(12) United States Patent
Haas et al.

(10) Patent No.: US 7,612,234 B2
(45) Date of Patent: Nov. 3, 2009

(54) PROCESSES FOR SEPARATING CARBON MONOXIDE FROM A HYDROGEN CHLORIDE-CONTAINING GAS

(75) Inventors: Michel Haas, Dormagen (DE); Dietmar Wastian, Dormagen (DE); Tim Loddenkemper, Dormagen (DE); Bernd Rüffer, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 11/752,391

(22) Filed: May 23, 2007

(65) Prior Publication Data

US 2007/0276158 A1 Nov. 29, 2007

(30) Foreign Application Priority Data

May 23, 2006 (DE) ................ 10 2006 024 542

(51) Int. Cl.
C07C 51/58 (2006.01)
(52) U.S. Cl. .................... 562/847; 562/848
(58) Field of Classification Search ........... 562/847, 562/848
See application file for complete search history.

(56) References Cited

U.S. PATENT DOCUMENTS

| | | | | | |
|---|---|---|---|---|---|
| 2,444,289 | A | * | 6/1948 | Burke Miles et al. | 562/847 |
| 3,960,916 | A | * | 6/1976 | Fuchs et al. | 560/347 |
| 3,996,273 | A | * | 12/1976 | Daumas | 562/847 |
| 4,128,569 | A | * | 12/1978 | Horn et al. | 560/347 |
| 4,190,639 | A | * | 2/1980 | Tsao | 423/491 |
| 4,346,047 | A | * | 8/1982 | Riegel | 562/847 |
| 4,764,308 | A | | 8/1988 | Sauer et al. | |
| 4,774,070 | A | | 9/1988 | Itoh et al. | |
| 4,803,065 | A | | 2/1989 | Itoh et al. | |
| 5,000,926 | A | * | 3/1991 | Murayama et al. | 422/197 |
| 5,449,818 | A | | 9/1995 | Biskup et al. | |
| 5,672,747 | A | * | 9/1997 | Stauffer | 562/847 |
| 5,707,919 | A | | 1/1998 | Miyata et al. | |
| 6,713,035 | B1 | | 3/2004 | Iwanaga et al. | |
| 6,833,469 | B2 | * | 12/2004 | Wolfert et al. | 560/347 |
| 6,852,667 | B2 | | 2/2005 | Hibit et al. | |
| 6,916,953 | B2 | | 7/2005 | Walsdorff et al. | |
| 6,962,682 | B2 | * | 11/2005 | Walsdorff et al. | 423/502 |
| 6,974,880 | B2 | | 12/2005 | Biskup et al. | |
| 2004/0024244 | A1 | * | 2/2004 | Walsdorff et al. | 560/347 |
| 2004/0192959 | A1 | * | 9/2004 | Woelfert et al. | 560/347 |
| 2006/0099138 | A1 | * | 5/2006 | Walsdorff et al. | 423/502 |
| 2006/0123842 | A1 | * | 6/2006 | Sohn et al. | 62/617 |

FOREIGN PATENT DOCUMENTS

| | | | |
|---|---|---|---|
| AU | 2003285303 | * | 5/2004 |
| DE | 1 567 788 | | 5/1970 |
| DE | 1 567 599 | | 9/1970 |
| DE | 33 27 274 | | 2/1985 |
| DE | 42 17 019 | | 11/1993 |
| DE | 102 50 131 | | 5/2004 |
| DE | 103 07 141 | | 9/2004 |
| EP | 0 251 731 | | 1/1988 |
| EP | 0 711 599 | | 5/1996 |
| EP | 0 761 593 | | 3/1997 |
| EP | 0 796 819 | | 9/1997 |
| EP | 0 936 184 | | 8/1999 |
| GB | 583477 | | 12/1946 |
| GB | 737442 | | 9/1955 |
| GB | 1046313 | | 10/1966 |
| GB | 1073855 | | 6/1967 |
| JP | 62-270404 | | 11/1987 |
| JP | 2003-171103 | | 6/2003 |
| WO | WO-96/16898 | | 6/1996 |
| WO | WO-97/24320 | | 7/1997 |
| WO | WO-97/30932 | | 8/1997 |
| WO | WO-2004/014845 | | 2/2004 |
| WO | WO 2004037718 A2 | * | 5/2004 |

OTHER PUBLICATIONS

A. Blanchard, "The Volatile Metal Carbonyls," *Research Laboratory of Inorganic Chemistry*, (Aug. 2, 1937), pp. 3-38, The Massachusetts Institute of Technology, Cambridge, Massachusetts.
M. Haruta et al., "Low-Temperature Oxidation of CO over Gold Supported on $TiO_2$, $\alpha\text{-}Fe_2O_3$, and $Co_3O_4$," *Journal of Catalysis* (1993), pp. 175-192, vol. 144.
K. Omata et al., "Active site of substituted cobalt spinel oxide for selective oxidation of $CO/H_2$. Part II," *Applied Catalysis A: General* (1996), pp. 255-267, vol. 146.

(Continued)

*Primary Examiner*—Sikarl A Witherspoon
(74) *Attorney, Agent, or Firm*—Connolly Bove Lodge & Hutz LLP

(57) ABSTRACT

Processes for separating carbon monoxide from a hydrogen chloride-containing gas, which comprise reacting the carbon monoxide with chlorine to form phosgene and then optionally separating the phosgene from the hydrogen chloride-containing gas. The hydrogen chloride-containing gas that is used preferably derives from a phosgenation or isocyanate forming reaction.

16 Claims, 3 Drawing Sheets

OTHER PUBLICATIONS

E. Cariati et al., "The Surface of Inorganic Oxides or Zeolites as a Nonconventional Reaction Medium for the Selective Synthesis of Metal Carbonyl Complexes and Clusters," *Chem. Rev.* (2003), pp. 3707-3732, vol. 103.

T.X.T. Sayle et al., "Oxidising CO to $CO_2$ using ceria nanoparticles," *Phys. Chem. Chem. Phys.* (2005), pp. 2936-2941, vol. 7.

M. Ruszel et al., "$M^{II}Cr_2O_4$-spinels as supports for Au nanoparticles in oxidation of CO," *Catalysis Today* (2006), pp. 126-129, vol. 112.

U.R. Pillai et al., "Highly active gold-ceria catalyst for the room temperature oxidatino of carbon monoxide," *Applied Catalysis A: General* (2006), pp. 266-273, vol. 299.

* cited by examiner

Process for separating CO from an HCl/CO gas mixture (invention)

Recovery of CO in isocyanate synthesis (conventional)

Recovery of CO in isocyanate synthesis (invention)

PROCESSES FOR SEPARATING CARBON MONOXIDE FROM A HYDROGEN CHLORIDE-CONTAINING GAS

BACKGROUND OF THE INVENTION

Many chemical processes which include a reaction with chlorine or phosgene, such as the production of isocyanates or chlorination reactions of aromatic compounds, lead to formation of hydrogen chloride. Such formed hydrogen chloride can be converted back to chlorine by electrolysis, such as described in, for example, WO97/24320A1. In comparison to this type of energy-intensive method, the direct oxidation of hydrogen chloride with pure oxygen or an oxygen-containing gas in the presence of a heterogeneous catalyst (such as, for example, what is often referred to as the Deacon process) according to the following reaction:

$$4HCl + O_2 \leftrightarrow 2Cl_2 + 2H_2O$$

offers advantages in terms of energy consumption. Such a process is described, for example, in WO 04/014845, the entire contents of which are incorporated herein by reference.

In many processes which include a reaction with chlorine or phosgene, such as in particular phosgenation, a relatively large amount of carbon monoxide (CO) can be included in the resulting HCl containing waste gas as an impurity. In the generally widely used liquid phase phosgenation reactions, carbon monoxide in an amount from 0 to 3 vol. % can be found in the HCl waste gas from the phosgene scrubbing column. In state-of-the-art gaseous phase phosgenations, even higher CO amounts (up to more than 5%) can be expected, since in such methods preferably no condensation of phosgene, and therefore no associated large scale separation of the unreacted carbon monoxide, is carried out before the phosgenation.

In the conventional catalytic oxidation of hydrogen chloride with oxygen, a very wide range of catalysts can be employed, e.g., based on ruthenium, chromium, copper, etc. Such catalysts are described, for example, in DE1567788A1, EP251731A2, EP936184A2, EP761593A1, EP711599A1 and DE10250131A1, the entire contents of each of which are herein incorporated by reference. Such catalysts can however at the same time act as oxidation catalysts for other components that may be present in a reaction stream, such as carbon monoxide or various organic compounds. The catalytic carbon monoxide oxidation to carbon dioxide is however extremely exothermic and can cause uncontrolled local temperature rises (hot spots) at the surface of heterogeneous catalysts, with the result that a deactivation of the catalyst with respect to the HCl oxidation may occur. For example, without cooling, the oxidation of 5% carbon monoxide in an inert gas (e.g., $N_2$) at an inflow temperature of 250° C. (described operating temperatures in Deacon processes are generally 200°-450° C.) would result in a temperature rise of far above 200° C. One likely reason for the catalyst deactivation may be microstructural change of the catalyst surface, e.g., by sintering processes, on account of the formation of hot spots.

Furthermore the adsorption of carbon monoxide on the surface of the catalyst cannot be excluded. The formation of metal carbonyls may take place reversibly or irreversibly and may thus occur in direct competition to the desired HCl oxidation. Carbon monoxide can, at high temperatures, form very stable bonds with some elements, such as, e.g., osmium, rhenium, ruthenium (see, e.g., CHEM. REV. 103, 3707-3732, 2003), and may thereby inhibit the desired target reaction. A further disadvantage could arise due to the volatility of such metal carbonyls (see, e.g., CHEM. REV. 21, 3-38, 1937), whereby not inconsiderable amounts of catalyst are lost and in addition, depending on the application, an expensive and complicated purification step of the reaction product can be necessary.

Processes for the oxidation of hydrogen chloride with oxygen in which the carbon monoxide content of the gas that is used is adjusted in advance to less than 10 vol. % by palladium-catalysed combustion to form carbon dioxide, separation of the hydrogen chloride gas by distillation, or scrubbing of the gas with a solution of copper chloride to extend the lifetime of the catalyst, have been suggested.

In another known process a hydrogen chloride-containing waste gas is fed into an aqueous alkaline absorption system and the waste gas freed from hydrogen chloride and phosgene is sent to a combustion plant.

A disadvantage of the previously suggested processes for overcoming the aforementioned problems is the destruction of the a valuable carbon monoxide raw material along with its removal.

Therefore, it would be desirable to separate the carbon monoxide from such hydrogen chloride-containing waste gases, in order to prevent disadvantages caused thereby in a subsequent Deacon process, and simultaneously make use of the carbon monoxide in an economic manner.

BRIEF SUMMARY OF THE INVENTION

The present invention relates, in general, to processes for separating carbon monoxide from a hydrogen chloride-containing gas, which comprise reacting the carbon monoxide with chlorine to form phosgene. The phosgene can then be separated from the hydrogen chloride-containing gas and used in reactions and syntheses which require phosgene. The hydrogen chloride-containing gas that is used initially is preferably derived from a phosgenation or isocyanate forming reaction. The process according to the invention is preferably used as part of a chlorine cycle in an isocyanate forming reaction.

The present inventors have discovered a significant advantage in reacting carbon monoxide contained in an HCl waste gas, in particular that from an isocyanate synthesis or a chlorination reaction, with chlorine to form phosgene, and to further separating the phosgene that is formed for subsequent use in the isocyanate synthesis or in any other process requiring phosgene.

The substantially carbon monoxide-free gas produced by processes according to the invention can be supplied, in particular, to a Deacon process, wherein the resulting chlorine can be used in turn to produce phosgene. The processes according to various embodiments of the invention alleviate the need for the separation of carbon monoxide from phosgene through the particularly energy-consuming condensation of the phosgene. Carbon monoxide can be left in the phosgene during isocyanate formation and separated from the waste gas afterwards, prior to HCl oxidation, by a process according to the invention. In a Deacon process, the risk of the formation of hot spots and the associated catalyst deactivation due to the exothermic formation of $CO_2$ from CO can be avoided. Furthermore, no accumulation of carbon dioxide occurs in the recycling stream in the Deacon process.

One embodiment of the present invention includes a process comprising providing an initial gas comprising carbon monoxide and hydrogen chloride, reacting the carbon monoxide with chlorine to form a product gas comprising phosgene and hydrogen chloride.

In a preferred embodiment of a process according to the invention the phosgene is subsequently separated from the product gas, and the substantially phosgene-free product gas can then preferably undergo hydrogen chloride oxidation by a Deacon process.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there is shown in the drawing an embodiment which is presently preferred. It should be understood, however, that the invention is not limited to the precise arrangements and instrumentalities shown.

In the FIGS..

DETAILED DESCRIPTION OF THE INVENTION

Figure 1:
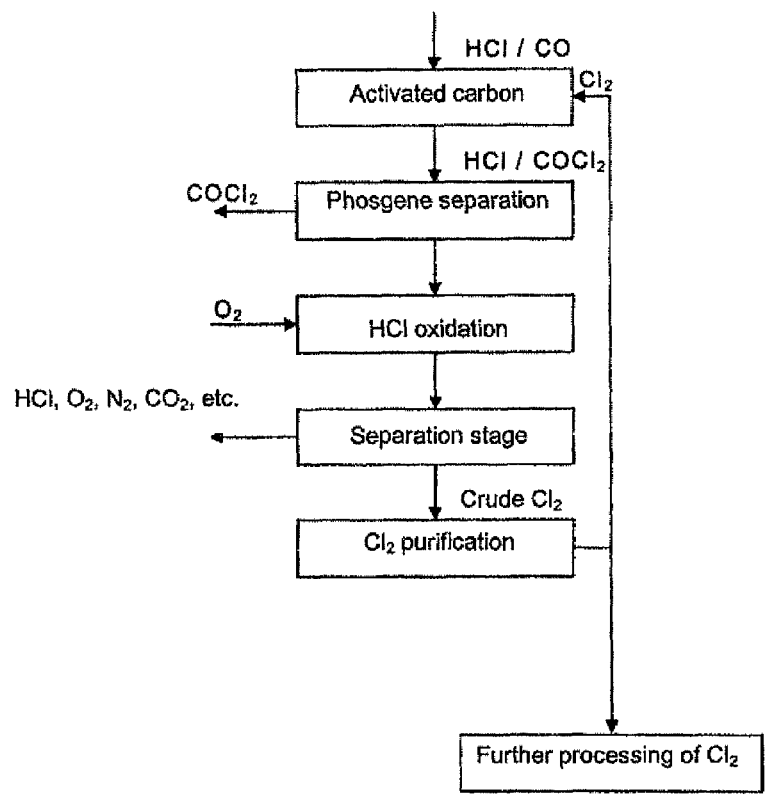
FIG. 1 is a flow chart illustrating a process according to one embodiment of the present invention.

As used herein, the singular terms "a" and "the" are synonymous and used interchangeably with "one or more." Accordingly, for example, reference to "a gas" herein or in the appended claims can refer to a single gas or more than one gas. Additionally, all numerical values, unless otherwise specifically noted, are understood to be modified by the word "about."

Any gas which contains at least hydrogen chloride (HCl) and carbon S monoxide (CO) can be used as the initial gas in the processes according to the invention. The initial gases are preferably process gases arising from isocyanate production by reaction of organic amines with phosgene or gases arising from the chlorination of hydrogen chloride. The initial gases that are used contain, for example, from around 0.1 to around 20 vol. %, preferably from around 0.5 to 15 vol. %, of carbon monoxide. The content of hydrogen chloride is, for example, from 20 to 99.5 vol. %, preferably from 50 to 99.5 vol. %. Other residual gases which may be present in the initial hydrogen chloride-containing gas are, for example, nitrogen, oxygen, carbon dioxide and noble gases. They represent around 0.5 to 80 vol. %, for example.

The reaction of carbon monoxide in the initial hydrogen chloride-containing gas that is used takes place in a manner known per se, in particular, by the reaction of carbon monoxide with chlorine to form phosgene, for example, on an activated carbon catalyst. Alternative catalysts can also be used however. Such suitable catalysts are described, for example, in DE 3327274; GB 583477; WO 97/30932; WO 96/16898; and U.S. Pat. No. 6,713,035, the entire contents of each of which are herein incorporated by reference.

In one particularly preferred embodiment of a process according to the invention, the reaction of carbon monoxide with chlorine to form phosgene is carried out using activated carbon as a catalyst in a fixed bed reactor with a slight molar excess chlorine of (around 1.0 to 1.5 mol of $Cl_2$ per mol of CO), a temperature of about 20 to 600° C., and a pressure of about 1 to 20 bar.

Operating under pressure can allow the size of the reaction vessel to be reduced and can simplify the subsequent separation of the phosgene that can be carried out in various preferred embodiments, In contrast to the conventional production of phosgene, processes according to the invention for separating carbon monoxide can be performed with a molar chlorine excess in order to separate the carbon monoxide as completely as possible. The excess chlorine does not interfere with the chlorine oxidation process that preferably follows, as it is formed in any case. Conventional phosgene production is performed with an excess of carbon monoxide to prevent residues of chlorine in the produced phosgene.

After reaction of carbon monoxide with $Cl_2$, the phosgene that is formed can be separated by at least one operation selected from liquefaction or condensation of the phosgene; liquefaction (with cooling and/or under pressure) can optionally take place after first drying the gas mixture, as described, for example, in DE-A-1567599 and GB 737442, the entire contents of each of which are incorporated herein by reference; (it should be emphasised here that the amount of phosgene liquefied here is naturally much smaller than the amount of phosgene that would have to be liquefied after the actual phosgene production process to separate off the CO.); distillation or rectification and/or; scrubbing of the phosgene with a solvent, such as, e.g., monochlorobenzene or ortho-dichlorobenzene.

Separation of the phosgene by condensation or distillation is preferred.

According to various embodiments of the invention, the phosgene separated off in this way is preferably returned to a phosgenation reaction, such as, for example, in an isocyanate production process. The separated phosgene is particularly preferably returned to the same phosgenation reaction in which the hydrogen chloride-containing initial gas used according to the invention was formed.

The resulting hydrogen chloride-containing product gas preferably has a CO content of less than 1 vol. %, more preferably less than 0.5 vol. %.

According to various embodiments of the invention, after separation of the phosgene the hydrogen chloride-containing gas preferably undergoes catalytic oxidation with oxygen in a manner known per se. The commonly accepted name for this process is the "Deacon process". With regard to the performance of HCl oxidation, reference can be made to the relevant prior art.

Preferred parameters for the catalytic oxidation of HCl in accordance with one embodiment of the present invention include the use of: ruthenium, chromium, copper, bismuth compounds as the catalyst; a molar ratio of $HCl:O_2$: of 4:1 to 1:1; a temperature of 200 to 450° C.; a pressure of 1 to 100 bar; in a fixed bed, fluidised bed, or micro-reactor; under isothermal; or adiabatic conditions.

A particularly preferred embodiment of the process according to the invention comprises: (a) production of phosgene by reacting CO with $Cl_2$; (b) synthesis of an organic isocyanate (more preferably without prior separation of residual CO) with the phosgene produced; (c) separation of the organic isocyanates obtained; (d) separation of the carbon monoxide from the HCl-containing waste gas resulting from the isocyanate synthesis by reaction of the carbon monoxide with chlorine to form phosgene; (e) separation of the phosgene that is formed; (f) return of the phosgene formed to the isocyanate synthesis; and (g) subjecting the HCl-containing, CO-depleted gas to HCl oxidation; and optionally returning the $Cl_2$ that is formed to phosgene production, wherein this can include both the initial phosgene production and/or the subsequent phosgene production in connection with CO separation from the HCl process gas. In various embodiments, phosgene can be separated after HCl oxidation.

Figure 2:
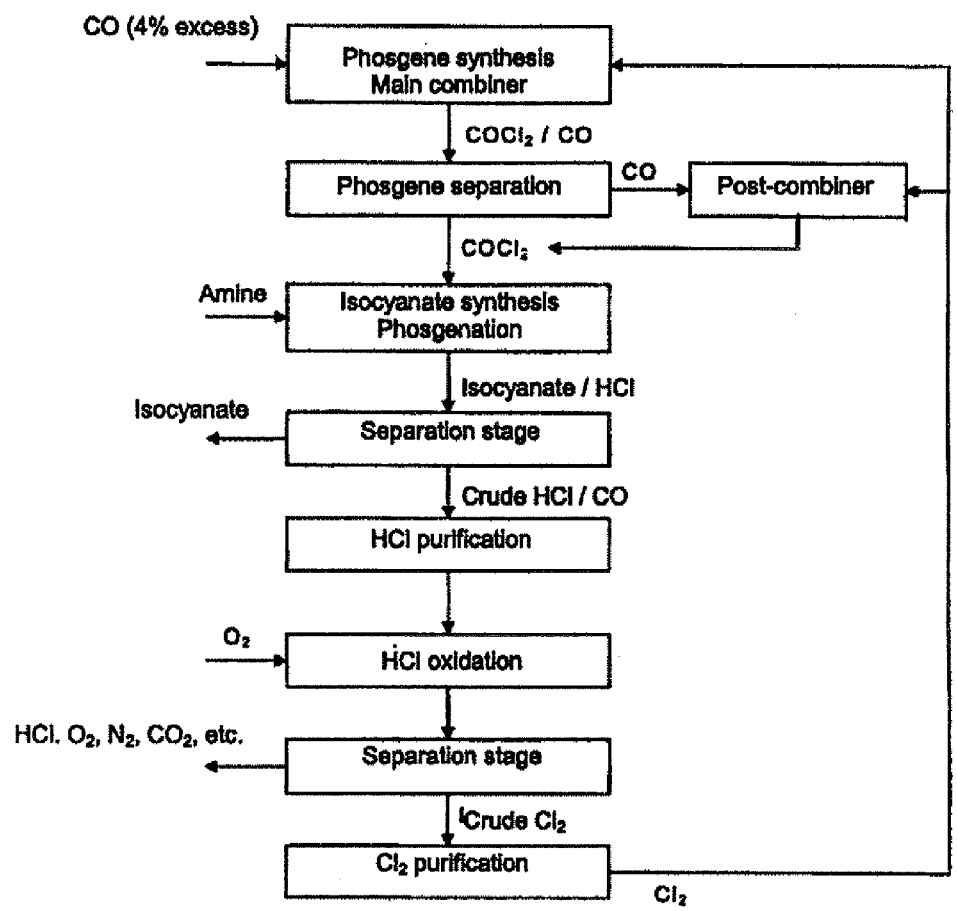
FIG. 2 is a flow chart illustrating a conventional process which includes conventional phosgene condensation.
Figure 3:
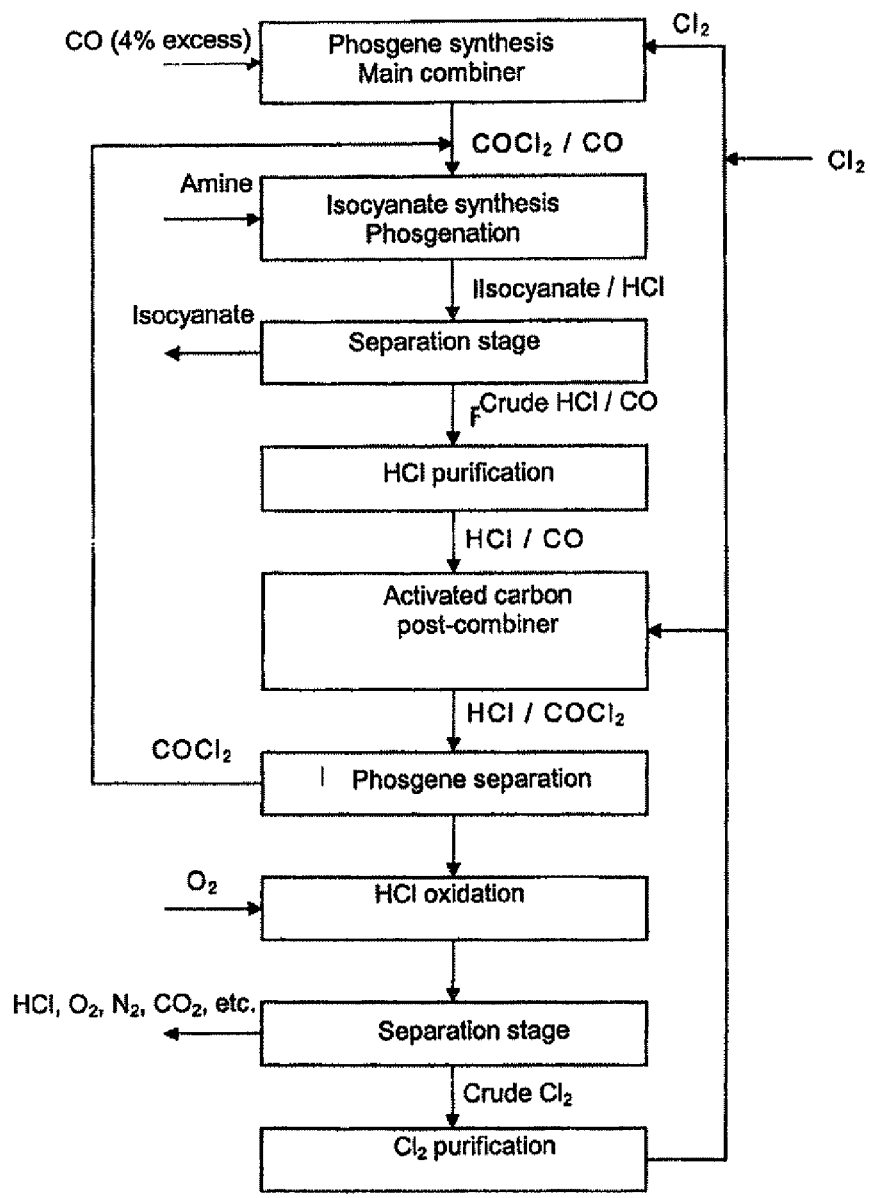
FIG. 3 is a flow chart illustrating a process in accordance with another embodiment of the present invention.

FIGS. 1 and 3 described below illustrate processes performed according to two embodiments of the invention. By contrast, FIG. 2 illustrates a conventional process wherein the CO formed in the phosgene synthesis is first separated off by condensation of the phosgene and then reacted with $Cl_2$ in a post-combiner to form phosgene. The disadvantage of this process, as explained above, lies in the fact that the condensation of the phosgene is very energy intensive.

FIG. 1 shows a process according to an embodiment of the invention in schematic form. An HCl/CO feed gas, which preferably derives from a phosgenation or isocyanate production process, is first reacted, preferably on an activated carbon catalyst, with chlorine to form an HCl/phosgene gas mixture. The phosgene is then separated off and preferably fed back to the phosgenation or isocyanate production process. The remaining HCl gas is then conveniently reacted in HCl oxidation by the Deacon process in a manner known per se, wherein after separation of the chlorine the process gas can optionally be returned to the Deacon reactor.

FIG. 3 shows the integration of a process according to an embodiment of the invention in an isocyanate synthesis process. Here the CO used in excess in the phosgene synthesis does not have to be separated off first, avoiding the need initially for an energy-intensive condensation of the phosgene. There is also no need for a post-combiner. The CO-containing phosgene is therefore used in this state in the isocyanate synthesis (or other synthesis). After separation of the isocyanate that is formed, the resulting CO/HCl-containing waste gas undergoes a separation process according to the invention with formation of phosgene, which phosgene is separated off and can be returned to the phosgenation reaction. The CO-enriched HCl gas, which preferably contains less than around 0.5 vol. % of CO, is then preferably subjected to the Deacon process, i.e. the catalytic oxidation of hydrogen chloride with oxygen to form $Cl_2$. The $Cl_2$ that is formed is separated off and returned to the phosgene synthesis process. The residual gas can optionally be returned to the Deacon process again. The isocyanate synthesis is performed in a manner known per se. Phosgene obtained by processes according to the invention can then be used for the production of TDI or MDI from TDA or MDA respectively by the processes known from the prior art. The hydrogen chloride produced in turn in the phosgenation of TDA and MDA can then be reacted to chlorine by the process described.

Through the processes according to the invention the carbon monoxide content in the HCl stream can be markedly reduced, as a result of which a deactivation of the Deacon catalyst in the next stage through an uncontrolled rise in temperature is slowed down. At the same time, the valuable carbon monoxide is reused by being converted into phosgene.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A process comprising:
   (a) providing an initial gas comprising carbon monoxide and hydrogen chloride; and
   (b) reacting the carbon monoxide with chlorine to form a product gas comprising phosgene and hydrogen chloride.

2. The process according to claim 1, further comprising separating the phosgene from the product gas.

3. The process according to claim 1, wherein the carbon monoxide is present in the initial gas in an amount of 0.5 to 15 vol. %.

4. The process according to claim 2, wherein the carbon monoxide is present in the initial gas in an amount of 0.5 to 15 vol. %.

5. The process according to claim 1, wherein the hydrogen chloride is present in the initial gas in an amount of 20 to 99.5 vol. %.

6. The process according to claim 3, wherein the hydrogen chloride is present in the initial gas in an amount of 20 to 99.5 vol. %.

7. The process according to claim 4, wherein the hydrogen chloride is present in the initial gas in an amount of 20 to 99.5 vol. %.

8. The process according to claim 1, wherein reacting the carbon monoxide with chlorine to form phosgene is carried out in the presence of a catalyst.

9. The process according to claim 8, wherein the catalyst comprises activated carbon.

10. The process according to claim 1, wherein reacting the carbon monoxide with chlorine to form phosgene is carried out in a fixed bed reactor on an activated carbon catalyst.

11. The process according to claim 2, wherein the separation of the phosgene comprises at least one operation selected from the group consisting of liquefaction of the phosgene, condensation of the phosgene, distillation of the phosgene, rectification of the phosgene, scrubbing of the phosgene with a solvent, and combinations thereof.

12. The process according to claim 2, wherein the separated phosgene is supplied to a phosgenation reaction.

13. The process according to claim 11, wherein the separated phosgene is supplied to a phosgenation reaction.

14. The process according to claim 2, wherein the separated phosgene is returned to a phosgenation reaction from which the initial gas was provided.

15. The process according to claim 11, wherein the separated phosgene is returned to a phosgenation reaction from which the initial gas was provided.

16. The process according to claim 2, further comprising subjecting the hydrogen chloride in the product gas to catalytic oxidation with oxygen subsequent to the separation of the phosgene.

* * * * *